United States Patent Office 2,988,495
Patented June 13, 1961

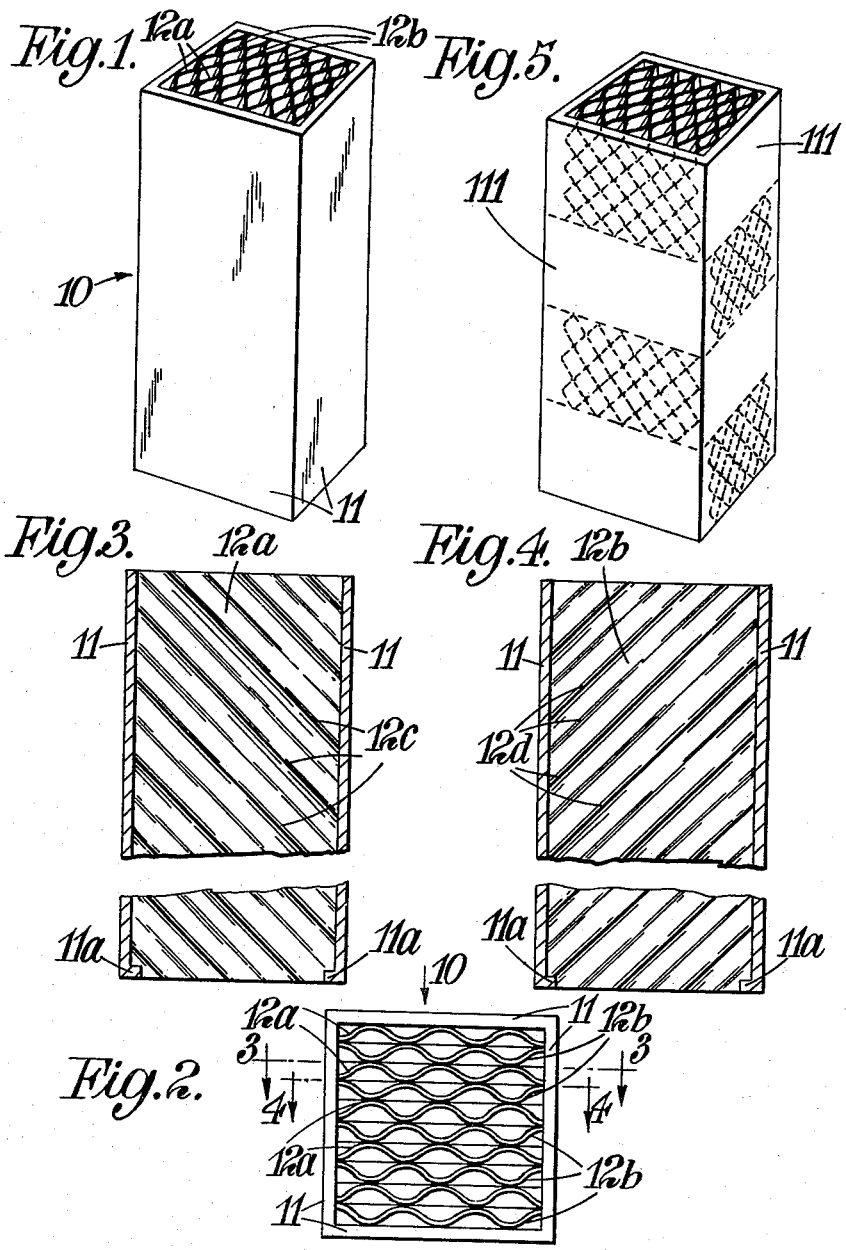

2,988,495
FUEL ELEMENT FOR NUCLEAR REACTOR
Norman Battle, Allestree, Derby, England, assignor to Rolls-Royce Limited, Derby, England, a British company
Filed July 11, 1958, Ser. No. 747,956
Claims priority, application Great Britain Aug. 8, 1957
7 Claims. (Cl. 204—193.2)

This invention comprises improvements in or relating to nuclear reactors and has for an object to provide an improved fuel element for such reactors.

According to the present invention a fuel element for a nuclear reactor comprises a plurality of thin rectangular sheets formed from clad fissionable material, each sheet having parallel corrugations inclined to its lengthwise axis and the sheets being stacked with the corrugations on adjacent sheets in contact and running across each other, the stack of sheets being contained in an open-ended tubular container adapted to have the coolant of the reactor passed therethrough. The tubular container may be of rectangular cross-section. Preferably the corrugations in a sheet lie at approximately 45° to its lengthwise axis.

The fissionable material may be clad, for example, in aluminium, steel, zirconium, niobium, or beryllium.

Fuel elements according to the invention present a large heat-transfer area to the coolant in relation to the quantity of fuel employed so that the temperature difference between the fuel and coolant may be decreased.

Clad sheets of fuel have the advantage that they do not contaminate the coolant with fission products. However, the presence of the cladding on the uranium reduces the temperature attainable and the increased surface area presented by fuel elements of the present invention tends to counteract this disadvantage.

Two embodiments of the invention will now be described with reference to the accompanying drawings in which:

FIGURE 1 is a perspective view of a fuel element according to the invention,
FIGURE 2 is a plan view of the element,
FIGURE 3 is a section on the line 3—3 of FIGURE 2,
FIGURE 4 is a section on the line 4—4 of FIGURE 2, and
FIGURE 5 is a perspective view of a second embodiment.

In the first embodiment shown in FIGURES 1 to 4 fuel element 10 consists of an open-ended tubular container 11 of rectangular cross-section formed by rectangular side plates of stainless steel and ten corrugated sheets, stacked within the box container with their planes parallel to the container axis, five of which sheets are referenced 12a and five 12b (FIGURE 2), the sheets 12a, 12b alternating in the stack. The sheets are of uranium clad with stainless steel. The coolant of the reactor flows through the container between its open ends in the passages formed between the corrugations of the sheets 12a, 12b.

In FIGURES 3 and 4 are shown respectively the sheets 12a and 12b. The sheets 12a have corrugations 12c pressed into them, the corrugations extending approximately at 45° to the longitudinal axis of the sheet. The sheets 12b have similar corrugations 12d but are positioned in the stack so that the corrugations 12c in sheets 12a are at approximately 90° to the corrugations 12d in sheet 12b.

The sheets 12a, 12b are stacked with the corrugations 12c, 12d on adjacent sheets in contact so that coolant flowing in the fuel element is constrained to flow alternately along the corrugations 12c, 12d. Thus, the path of a particle of coolant is of a zig-zag nature as its flows alternately along corrugations 12c and 12d.

The sheets 12a and 12b may be supported in the container by resting on a lip 11a formed at the bottom of the side plates 11 normal to the plane of the sheets.

Due to the obliquity of the corrugations in relation to the general direction of flow of the coolant the coolant flowing through each passage formed between a pair of adjacent plates tends to be evenly distributed across the width of the passage.

In FIGURE 5 is shown a second embodiment of the invention in which four stacks of corrugated sheets, each stack being similar to that described for the first embodiment, are inserted one above the other in a box formed from rectangular side plates III of stainless steel. It is arranged that the planes of the sheets in adjacent stacks are at right angles to each other. The bottom stacks may be supported on a lip as with the first embodiment.

One advantage of this arrangement is that if any maldistribution of coolant occurs at entry to the first stack it will tend to be rectified in the first two stacks due to the good distribution produced by the corrugations transversely of a passage between a pair of the corrugated sheets.

The fuel element 10 in FIGURES 1 to 4 on each of the four stacks of the fuel element in FIGURE 5 has the following particulars. The total thickness of each corrugated sheet 12a, 12b is .050 in., made up of stainless steel cladding .015 in. thick on a uranium oxide/stainless steel cermet .020 in. thick. Corrugation depth is .100 in. and the inside radius of the corrugations .500 in. The cross-section of each stack is 4.0 in. square and the length in the direction of coolant flow 9.0 in. The length of the fuel element in FIGURE 5 is thus 36.0 in.

I claim:
1. A fuel element for a nuclear reactor comprising a tubular container which is open at each end, and a plurality of thin rectangular sheets formed from clad fissionable material, each sheet having parallel corrugations inclined to its lengthwise axis and the sheets being stacked with the corrugations on adjacent sheets in contact and running across each other, the stack of sheets being contained in the open-ended tubular container, the spaces between the corrugations of the sheets defining a flow path for reactor coolant extending from one open end of said tubular container to the other open end thereof.

2. A fuel element according to claim 1, wherein the tubular container is rectangular in cross-section.

3. A fuel element according to claim 1, wherein the corrugations in each sheet lie at approximately 45° to its lengthwise axis so that the corrugations of adjacent sheets are approximately at 90° to one another.

4. A fuel element for a nuclear reactor comprising a tubular container which is open at each end, and a stack of corrugated sheets of clad fissionable material housed within the container with the sheets in planes parallel to the axis of the container, each sheet in the stack having its corrugations parallel to one another and inclined at an acute angle to the axis of the container, and each sheet having its corrugations in contact with and extending at an angle across the corrugations in each adjacent sheet, the spaces between the corrugations of the sheets defining a flow path for reactor coolant extending from one open end of said tubular container to the other open end thereof.

5. A fuel element according to claim 4, wherein the corrugations in each sheet are inclined at approximately 45° to the axis and extend across the corrugations of each adjacent sheet at an angle of approximately 90°.

6. A fuel element for a nuclear reactor comprising a tubular container of rectangular cross-section which is open at each end, and a plurality of stacks of corrugated sheets of clad fissionable material housed in the container one above the other, the sheets in the stacks being in planes parallel to the axis of the container and the planes of the sheets in each stack being at an angle to the planes of the sheets in adjacent stacks, each sheet having its corrugations parallel to one another and inclined at an acute angle to the axis of the container, and each sheet having its corrugations in contact with and extending at an angle across each adjacent sheet in its stack, the spaces between the corrugations of the sheets defining a flow path for reactor coolant extending from one open end of said tubular container to the other open end thereof.

7. A fuel element according to claim 6, wherein the planes of the sheets in adjacent stacks are at right angles to one another, and the corrugations in each sheet are inclined at approximately 45° to the axis of the container and extend across the corrugations of contacting sheets at an angle of approximately 90°.

References Cited in the file of this patent

UNITED STATES PATENTS

| | | |
|---|---|---|
| 1,751,757 | Phillips | Mar. 25, 1930 |
| 1,885,294 | Robertson | Nov. 1, 1932 |
| 2,526,157 | Ramen | Oct. 17, 1950 |
| 2,780,596 | Anderson | Feb. 5, 1957 |